(12) United States Patent
Starling et al.

(10) Patent No.: US 7,797,279 B1
(45) Date of Patent: Sep. 14, 2010

(54) MERGING OF INCREMENTAL DATA STREAMS WITH PRIOR BACKED-UP DATA

(75) Inventors: Jennifer Starling, Lake Forest, CA (US); Scott Ogata, Lake Forest, CA (US); Michael Smolenski, East Palo Alto, CA (US)

(73) Assignee: EMC Corporation, Hopkinton, MA (US)

( * ) Notice: Subject to any disclaimer, the term of this patent is extended or adjusted under 35 U.S.C. 154(b) by 368 days.

(21) Appl. No.: 11/968,061

(22) Filed: Dec. 31, 2007

(51) Int. Cl.
*G06F 17/30* (2006.01)
(52) U.S. Cl. .................................... 707/641
(58) Field of Classification Search ............... 707/200, 707/204, 641; 711/162
See application file for complete search history.

(56) References Cited

U.S. PATENT DOCUMENTS

| | | | |
|---|---|---|---|
| 6,675,177 B1 * | 1/2004 | Webb | 707/200 |
| 7,103,740 B1 * | 9/2006 | Colgrove et al. | 711/162 |
| 7,472,242 B1 * | 12/2008 | Deshmukh et al. | 711/162 |
| 2004/0054697 A1 * | 3/2004 | Tsaur et al. | 707/204 |
| 2005/0193235 A1 | 9/2005 | Sandorfi | |

\* cited by examiner

*Primary Examiner*—Etienne P LeRoux
(74) *Attorney, Agent, or Firm*—Workman Nydegger

(57) ABSTRACT

New full backups are generated by combining an incremental backup with a previous full backup. A previous full backup is stored in a backup server in a hash file system format. A file server generates an incremental backup of a data set on the file server by identifying and dumping files/directories of the data set that are new/modified into a tar file that is sent to an accelerator. The accelerator parses the incremental backup tar file and converts it to a hash file system format that includes metadata, hash values, and new/modified data atomics. The accelerator merges the incremental backup into the previous full backup to generate a new full backup by altering metadata and hash values of a copy of the previous full backup such that the resulting metadata and hash values describe and point to new/modified directories and files as well as unmodified directories and files.

20 Claims, 7 Drawing Sheets

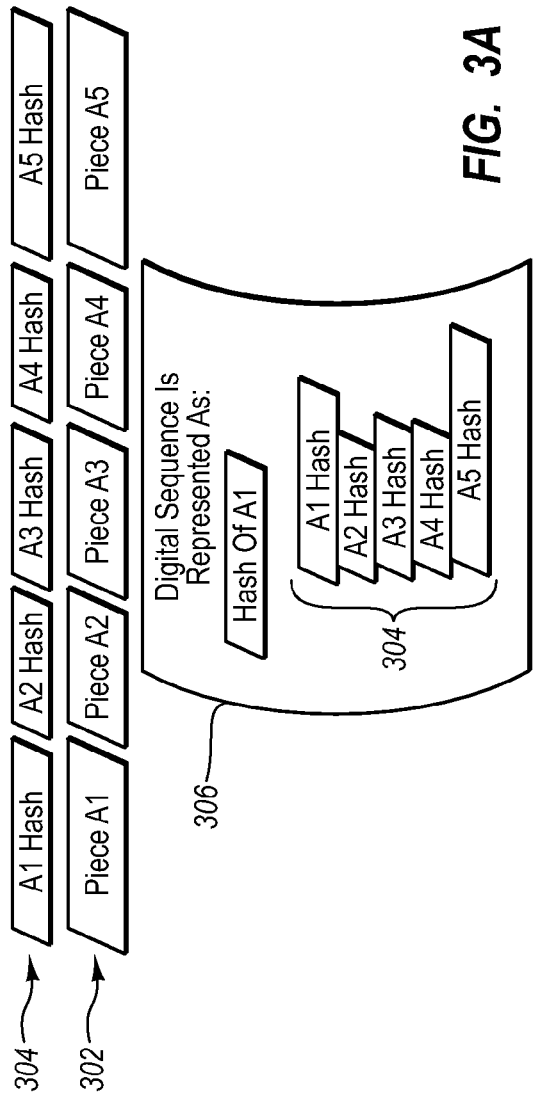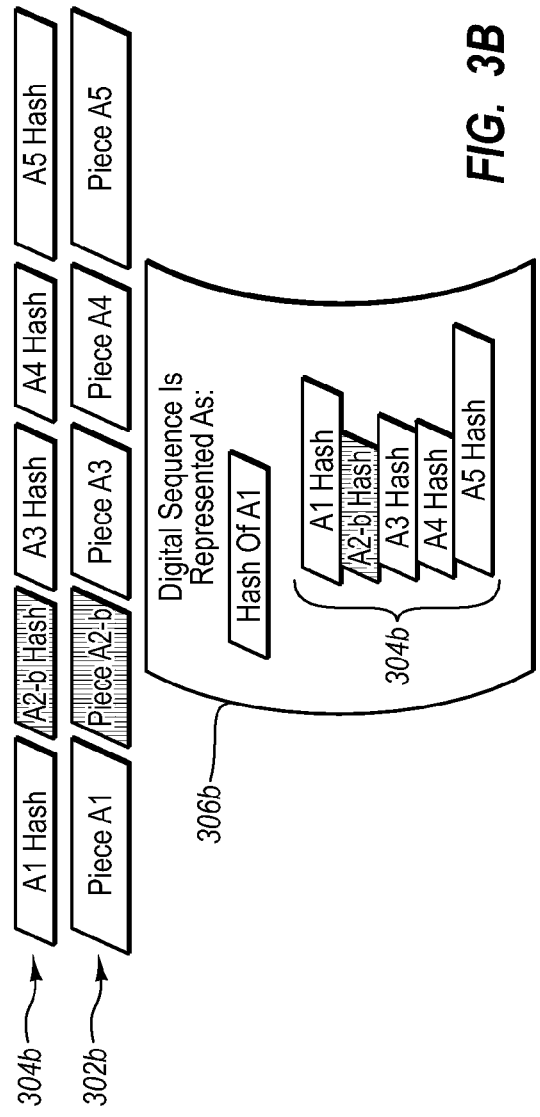

MERGING OF INCREMENTAL DATA STREAMS WITH PRIOR BACKED-UP DATA

CROSS-REFERENCE TO RELATED APPLICATIONS

Not Applicable.

BACKGROUND OF THE INVENTION

1. The Field of the Invention

The present invention relates to data backup and recovery solutions. More particularly, embodiments of the invention relate to software, hardware, systems, and methods for generating new full backups using previous full backups and incremental backups.

2. The Relevant Technology

Economic, political, and social power are increasingly managed by data. Transactions and wealth are represented by data. Political power is analyzed and modified based on data. Human interactions and relationships are defined by data exchanges. Hence, the efficient distribution, storage, and management of data is expected to play an increasingly vital role in human society.

The quantity of data that must be managed, in the form of computer programs, databases, files, and the like, increases exponentially. As computer processing power increases, operating system and application software becomes larger. Moreover, the desire to access larger data sets such as multimedia files and large databases further increases the quantity of data that is managed. Additionally, this increasingly large data load often requires one or more data protection services, which may include generating backups and performing other operations or services for the data, further increasing the quantity of data that must be managed.

Conventional backup systems include a backup server for storing backup data generated by production servers (e.g., file servers) and/or other backup server clients. File servers typically generate full backups on a somewhat infrequent basis while generating incremental backups much more frequently. For instance, a file server might perform weekly full backups and daily incremental backups. In either case, backups from file servers are often provided to the backup server in a sequential list format, such as tar or a variant thereof, that is suitable for tape cartridges or other sequential access storage devices.

Backups are useful for several purposes. One purpose, for example, is for disaster recovery, e.g., to restore a computer (such as a file server) to an operational state following a disaster. Another purpose is to restore small numbers of files that have accidentally, inadvertently, or otherwise been deleted, corrupted, or destroyed. In either case, restoration often involves retrieving a full backup and one or more incremental backups. When the full backup and the incremental backups are on different tape cartridges, restoration can be a very involved and complicated process. Additionally, the affected data set can only be restored up to the dump date of the most recent backup.

Thus, the usefulness and convenience of backup data may depend on a number of factors, including the frequency with which backups are generated and the type of backups (e.g., full vs. incremental) available for restoration. For example, the more frequently that backups are generated, the more up-to-date backup data is when restoration/recovery is desired. Similarly, a full backup is the most convenient for restoration since a data set can be restored up to the dump date of the full backup in a single operation without using any incremental backups.

Unfortunately, various network constraints may limit the frequency with which full backups can be performed. For instance, generating a full backup can be a resource intensive operation and may require taking a file server offline when generating a full backup. However, the needs of network users and other factors may limit the frequency with which the file server can realistically be taken offline. Additionally, sending a full backup over a network to a backup server may require a significant amount of network bandwidth. Once again, network bandwidth availability may be limited by the needs of users and/or other factors.

The subject matter claimed herein is not limited to embodiments that solve any disadvantages or that operate only in environments such as those described above. Rather, this background is only provided to illustrate one example technology area where some embodiments described herein may be practiced

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which:

FIGS. 3a and 3b illustrate the use of hash values and composites to store versions of a file or other digital sequence on a backup server;

DETAILED DESCRIPTION OF THE PREFERRED EMBODIMENTS

Figure 1:
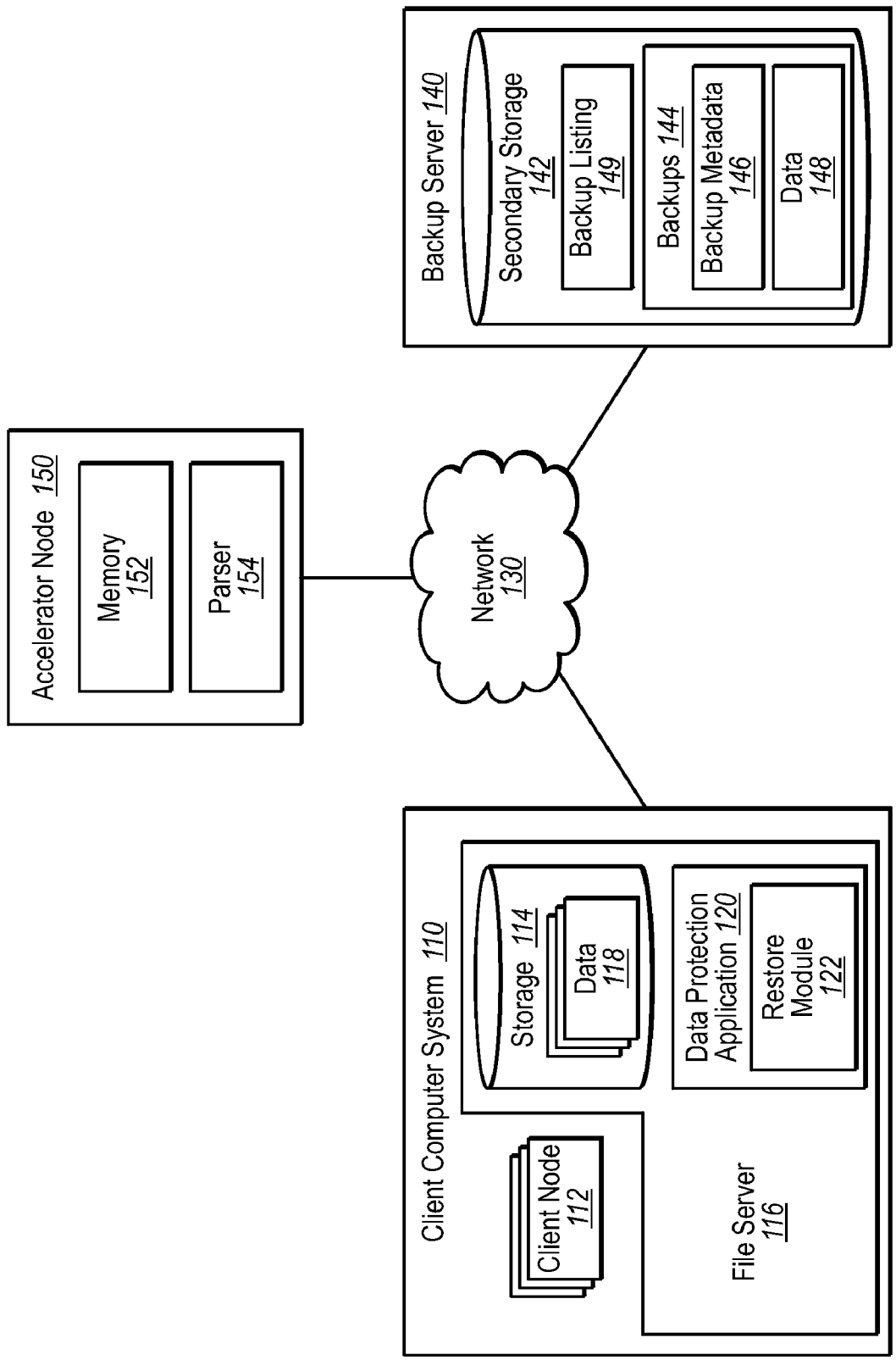
FIG. 1 illustrates an example operating environment in which embodiments of the invention can be implemented.

Embodiments of the invention relate to the merging of incremental backups with previous full backups to create new full backups. As used herein, a "backup" refers to a secondary copy of data that can be used to restore data that is deleted, lost, corrupted, destroyed, or otherwise becomes unavailable for use on a production server (such as a file server). Typically, backups are stored and/or managed by a backup server while the primary copy of the data is stored on a file server. When a backup is created, a dump date corresponding to the time the backup is created is stored by the backup server.

In one embodiment, a full backup of a data set (e.g., directories and files) or a subset of the data set on a file server can be created by requesting a full backup from the file server. In this case, the file server generates a full backup of the data set by dumping a copy of the data set into a tape archive ("tar")

file which can be transmitted over a network to an accelerator node. The accelerator node parses the tar file into directories, files, and/or data chunks that can then be stored individually by the backup server in randomly accessible storage, such as disk, rather than in sequential storage, such as tape. Additionally, the accelerator node generates metadata describing the organization/hierarchical structure of the data written to the backup server, the metadata including pointers to the underlying data. Advantageously, once a single full backup has been performed by the file server, new full backups can be generated by the accelerator node without the file server performing any additional full backups.

At a later time, an incremental backup can be generated at the file server by dumping a copy of data that is new or modified since the dump date of the previous backup into a single tar file sent to the accelerator node. The incremental backup tar file is parsed into one or more directories, files, and/or data chunks by the accelerator node after which the data is stored on the backup server. Metadata describing the organization/hierarchical structure of the data is generated by the accelerator node, the metadata including pointers to the underlying data.

A new full backup can be generated by combining or merging the incremental backup metadata into a copy of the full backup metadata. For example, when a directory containing new or modified data is identified in the incremental backup metadata, a copy of the full backup metadata for that directory can be retrieved from the backup server. For each new file identified in the incremental backup metadata, metadata describing the new file is added to the copy of the corresponding directory metadata. Similarly, for each modified file identified in the incremental backup metadata, metadata describing the modified file is written over the old file's metadata in the copy of the corresponding directory metadata. Where a file has been deleted, the metadata can be updated to so reflect. This process can be repeated for each directory until the incremental backup metadata is completely merged into the copy of the full backup metadata.

The resulting metadata describes a new full backup having the same dump date as the incremental backup, even though only an incremental backup was performed over the network. Further, the new full backup can be merged in the future with a subsequent incremental backup to create a subsequent new full backup. Advantageously, this significantly reduces network bandwidth requirements for backup operations as incremental backups are typically much smaller than full backups. Additionally, this permits data to be restored in a single operation (e.g., by selecting the new full backup), rather than in multiple operations as required by the prior art.

To practice the invention, the computer and network devices may be any devices useful for providing the described functions, including well-known data processing and storage and communication devices and systems such as computer devices typically used as hosts in user systems with processing, memory, and input/output components, and server devices configured to maintain and then transmit digital data over a communications network. Data typically is communicated in digital format following standard communication and transfer protocols. The data storage resources are generally described as disk, optical, and tape devices that implement RAID and other storage techniques and that may use SCSI and other I/O, data transfer, and storage protocols, but the invention is not intended to be limited to the example embodiments or to specific hardware and storage mechanisms as it is useful for nearly any computer environment.

FIG. 1 illustrates one embodiment of an example operating environment or system 100 in which embodiments of the invention may be implemented. The system 100 is shown in simplified or example form and is intended to represent a distributed network of computer systems/devices that generate digital data that is protected with backup copies stored in an archive or backup file system (such as a disk or other randomly accessible archival solution). As shown, the system 100 includes a client computer system 110 (such as a networked enterprise system, a data center, or the like) in which a plurality of client nodes 112 such as desktops, laptops, portable computing devices, and/or other computer workstations are running one or more applications. The client nodes 112 generate data that can be stored as data sets 118 in storage 114 on file server 116. The file server 116 may comprise, for instance, a NAS file server, and is configured to generate backups in a sequential access format, such as the tar stream format.

While the invention will mainly be discussed in the context of the tar stream format, the file server 116 may alternately or additionally be configured to generate backups using one or more different sequential access formats. Examples of other sequential access formats include emctar, pax (or px), and the like or any combination thereof.

In the file server 116, a data protection application 120 is provided that has a restore module 122 for restoring the data sets 118 when recovery is required, e.g., when corruption and/or loss of data occurs. To this end, the data protection application 120 may be nearly any data protection application or system that is useful for creating backups, snapshots, and/or archive copies of data for later recovery from disaster, system crashes, or the like. The data protection application 120 communicates over network 130 (e.g., a LAN, a WAN, the Internet, or other wired and/or wireless digital communications network) with a backup server 140 that includes secondary storage 142.

The secondary storage 142 may be a disk-based or other randomly accessible archival mechanism and in one embodiment comprises content-addressed storage. Generally, content-addressed storage ("CAS") includes a method of providing access to fixed or specific data content by assigning it a permanent place on disk or other data storage. When a data object is stored in CAS, the object is given a name or identifier (such as a hash number) that uniquely identifies it and that also specifies the storage location, and this type of address is called a "content address."

The data protection application 120 typically generates backups of the data sets 118 in an archive format such as tar. The backups may take many forms to practice the invention and may include complete copies of content (e.g., full backups), changes to the content (e.g., incremental backups), and the like or any combination thereof. In one embodiment, backup files (e.g., full or incremental backups) are de-duplicated at the file server 116 prior to being sent to the backup server 140 in the tar stream (or other sequential access) format. The restore module 122 may be used to restore the file server 116 using backup data that has been backed up or archived in the backup server 140.

Figure 2:
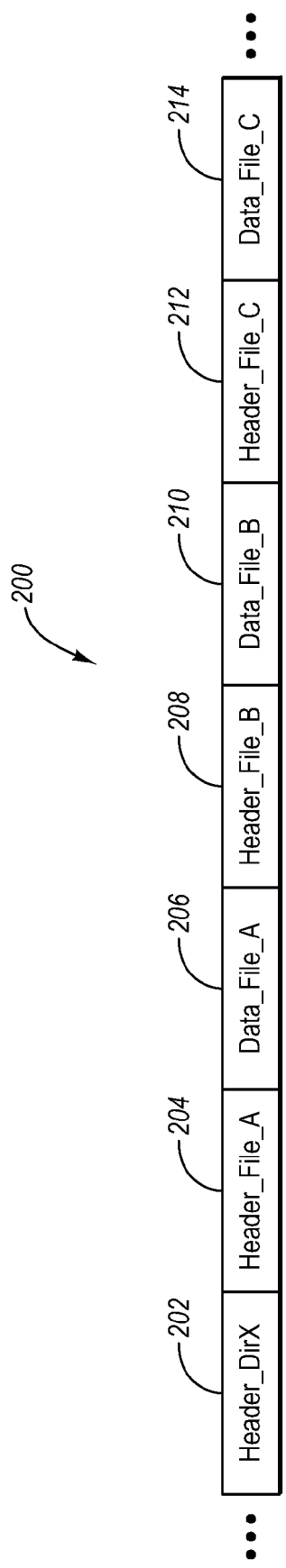
FIG. 2 depicts an example portion of a tar stream for a full backup.

FIG. 2 conceptually illustrates a portion of a tar backup stream or file 200. Generally, a tar file is the concatenation of one or more files and may additionally include directory structure information, and the like. In the present embodiment, the portion of the tar file 200 illustrated in FIG. 2 may correspond to a full backup of a Directory X of one of the data sets 118 of FIG. 1. As shown, the tar file 200 includes directory structure information 202. The data 206, 210, 214 for each of three files File A, File B and File C is preceded, respectively, by header blocks 204, 208, and 212. Each of the header blocks 204, 208, 212 contains metadata about the three files File A, File B, File C, such as file names, owner user ID, file size in bytes, and the like or any combination thereof.

As mentioned above, backup files can be de-duplicated at the file server 116 prior to being sent to the backup server 140. Where the full backup of Directory X is de-duplicated prior to creation of the tar file 200, the data 206, 210, 214 may include, for instance, a hash of the corresponding file data, rather than the data itself. Alternately or additionally, de-duplication can be performed at the backup server 140 or accelerator node 150 after the file server 116 generates the tar file 200. Where the full backup of Directory X is de-duplicated after creation of the tar file 200, the data 206, 210, 214 may include all of the data for Files A, B, and C, respectively.

One skilled in the art will appreciate that tar backup files and other sequential access archive formats are widely used for backing up data to tape drives. As will be described more fully below, however, embodiments of the invention involve using tar backup files for performing backup to disk.

Returning to FIG. 1, the backups generated by the data protection application 120 are parsed and converted from the tar format to a hash file system format prior to being stored in the secondary storage 142 as backups 144. Basically, the hash file system organizes backups using a tree structure, with a root hash for each backup pointing to a directory element or composite that includes metadata 146 describing and pointing to directories, files, and data chunks or atomics 148 of the backup. The hash file system, when used with content-addressed storage, reduces storage requirements by eliminating redundant data since it allows multiple backups to point to single instances of data that are common to the multiple backups. The backup server 140 may maintain a backup listing or table 149 that identifies available backups stored in storage 142, the dump dates of the available backups, and the like.

As previously mentioned, backups are parsed and converted prior to being stored in storage 142. In one embodiment, the parsing and conversion is performed by the backup server 140. Alternately or additionally, the parsing and conversion can be performed by the accelerator node 150, as illustrated in FIG. 1. The accelerator 150 may comprise a node with a large amount of processing power and memory but no disk storage. This enables the accelerator 150 to quickly perform the operations and other functions described herein. The accelerator node may additionally de-duplicate backups using data protection application 156 in the process of converting them from the sequential access format to the hash file system format.

When a backup is generated and provided to the accelerator 150, the accelerator reads the backup tar stream into memory 152. The parser 154 parses the backup tar stream into individual directories, files, and so on, which may additionally include data chunks or atomics when de-duplication is performed at the file server 116. When de-duplication is performed at the accelerator node 150, the data protection application 156 breaks the parsed directories and files into pieces (also referred to as atomics), hashes the directories, files, and pieces, and uses the resulting hash values to identify and eliminate redundant data so that only new/non-redundant data is saved on the backup server. In the process, the backup is converted from a sequentially accessible format (e.g., tar stream format) into the hash file system format. Embodiments of the hash file system format are described more fully in U.S. Pat. No. 6,704,730, filed Feb. 5, 2001 and entitled HASH FILE SYSTEM AND METHOD FOR USE IN A COMMONALITY FACTORING SYSTEM, which patent is herein incorporated by reference in its entirety. The new/non-redundant data chunks or atomics (either parsed out of the backup tar stream or derived from the directories and/or files parsed out of the tar stream) are sent to the backup server 140 for storage with the data 148.

To create a new full backup when the backup tar stream provided to the accelerator node is an incremental backup, the accelerator 150 merges the incremental backup with the prior full backup as follows. First the accelerator node 150 reads an incoming incremental backup tar stream into memory 152 and parses it into individual directories, files, and so on. Second, the accelerator node de-duplicates the incremental backup (if not already performed by the file server), ultimately converting it to the hash file system format in the process. When the accelerator node 150 sees a particular directory, for instance Directory X in this example, in the parsed incremental backup, it retrieves a copy of the metadata for a previous full backup of Directory X from the backup metadata 146 of the backup server 140.

The accelerator node 150 then merges the metadata for the incremental backup of Directory X into the copy of the metadata for the previous full backup of Directory X. For instance, if the incremental backup of Directory X includes a new file, metadata pointing to the underlying data of the new file can be added to the copy of the metadata for the previous full backup of Directory X. Alternately or additionally, if the incremental backup of Directory X includes a modified file, metadata pointing to the underlying data of the modified file can be written over the metadata pointing to the underlying data of the corresponding unmodified file. Alternately or additionally, if the incremental backup of Directory X indicates that a file has been deleted from Directory X, the metadata pointing to the underlying data for the deleted file can be deleted from the copy of the metadata for the previous full backup of Directory X.

In some embodiments of the invention, the incremental backup may not indicate that a file or directory has been deleted from the data set being backed up on the file server 116. Instead, the file server 116 may send a history stream to the accelerator node 150 along with the incremental backup tar file. The history stream contains a list of all files, folders, and directories in the data set being backed up. Once the metadata for the incremental backup has been merged into the metadata for the previous full backup to generate a new full backup, the accelerator node may merge the data from the history stream into the new full backup. This may include, for instance, the accelerator node comparing the list of files, folders and directories identified in the history stream to the files, folders and directories in the new full backup. If the new full backup includes any files, folders, or directories that are not also in the history stream, this may indicate that such files, folders, or directories have been deleted from the data set. In this case, the metadata for the new full backup pointing to the deleted files, folders, or directories can therefore be deleted from the metadata for the new full backup.

Once all of the changes (e.g., new files, modified files, and deleted files) indicated by the metadata for the incremental backup are merged into the copy of the metadata for the previous full backup, the resulting metadata describes and points to data for a new full backup. The metadata for this new full backup can then be stored with the other backup metadata 146 in the backup server 140. The backup listing 149 can be updated with information for the new full backup.

Figure 4:
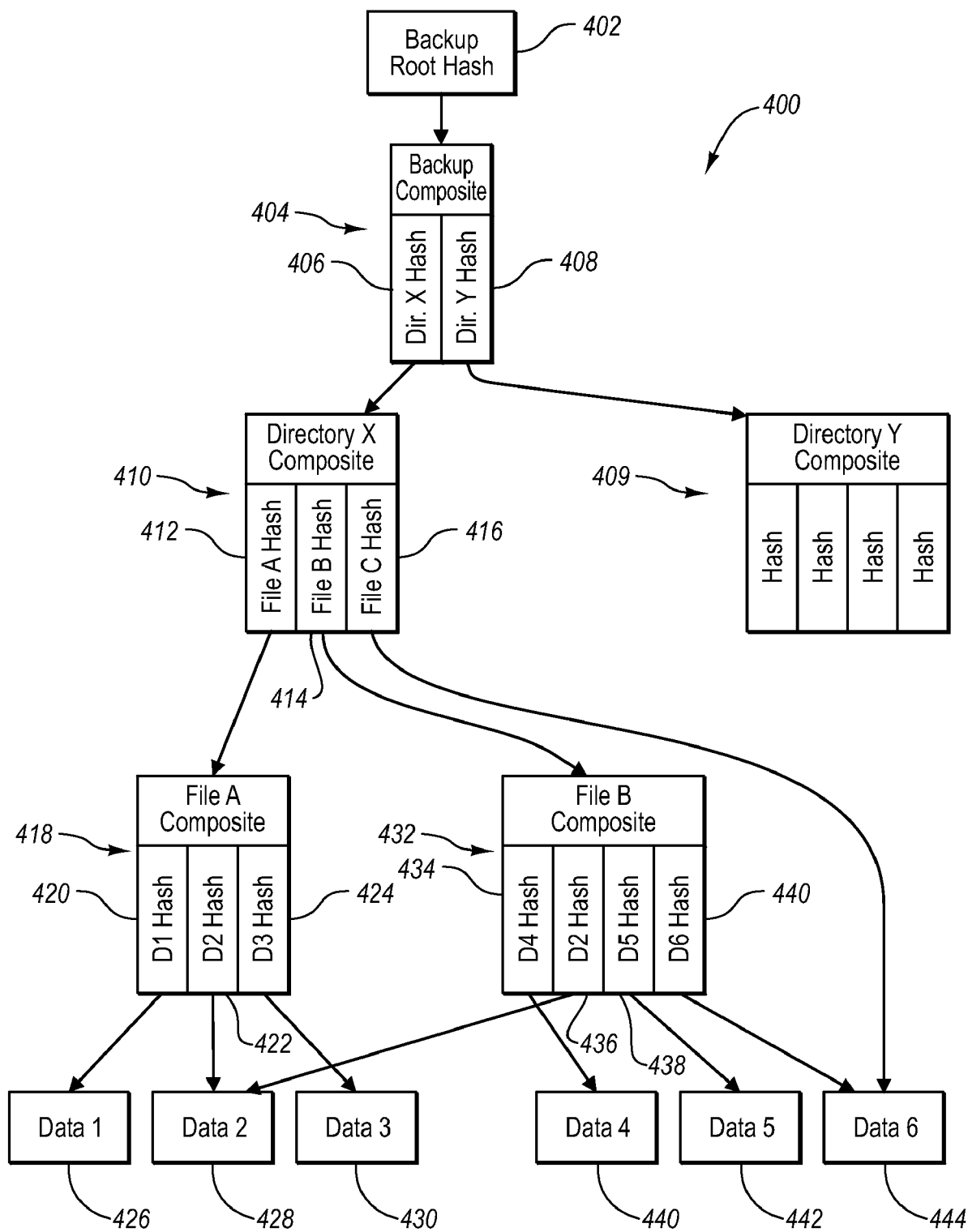
FIG. 4 conceptually illustrates a hash file system format of a full backup.

With additional reference to FIGS. 3a-4, various aspects of the hash file system implemented according to embodiments of the invention are illustrated. The hash file system enables the merging of incremental backups into previous full backups to create new full backups. Advantageously, this reduces bandwidth requirements for performing backups as well as simplifying the restore process.

In particular, FIG. 3a conceptually illustrates how an individual file or other digital sequence (referred to in this example as File A) is stored on the backup server 140. As shown, File A is stored in data chunks or atomics 302, represented as pieces A1, A2, A3, A4, and A5. In some embodiments, File A is broken into chunks by the file server 116 (and more specifically, the data protection application 120) prior to being received by the backup server 140, while in other embodiments File A is broken into chunks by the accelerator node 150 (or the data protection application 156). A hash function is performed on each of the atomics 302 to obtain hash values 304, which may be performed by the file server 116 or accelerator node 150 depending on the implementation. Using the hash values 304, the atomics 302 can be stored by their content, with the hash values 304 acting as pointers to the corresponding atomics.

Because File A is stored in separate pieces or atomics 302, the backup server may store a composite or recipe 306 for reconstructing File A from its individual atomics 302, the composite or recipe being generated by the data protection application 120 or 156 performing the de-duplication. In this case, since the atomics 302 are stored by content using the hash values 304 as pointers, the composite or recipe 306 for File A may include the hash values 304 and optionally a hash of File A itself (or a hash of the hash values 304 of the pieces 302 of File A). Additionally, the composite of File A can be stored by its content, with the hash of File acting as a pointer to the composite.

FIG. 3b conceptually illustrates how a modified File A can be stored on the backup server 140 and additionally how redundant data can be eliminated from backups. The modified File A of FIG. 3b is almost identical to the original File A of FIG. 3a, with the exception of one portion that has been modified. In particular, pieces A1, A3, A4, and A5 are identical in FIGS. 3a and 3b, while piece A2 in FIG. 3a has been modified to create piece A2-b in FIG. 3b. Modified File A can be reconstructed from modified composite 306b that includes the hash values 304b for pieces A1, A2-b, A3, A4, and A5.

In FIGS. 3a and 3b, composites or recipes are used to reconstruct individual files that have been broken into atomics to eliminate redundant data. In particular, the composite 306 of original File A can be used to reconstruct File A from pieces A1, A2, A3, A4, and A5 while the composite 306b of modified File A can be used to reconstruct modified File A from four of the same pieces as original File A. Thus, the backup server can store a single instance of pieces A1, A3, A4, and A5. In a similar manner, composites or recipes can be used to reconstruct other data structures such folders, directories, and entire full backups of data on the file server 116.

For instance, FIG. 4 conceptually illustrates a simplified representation of a full backup 400 stored on the backup server 140 that implements the hash file system. As shown, the backup 400 includes a plurality of composites, hash values, and atomics and can be identified and retrieved using a backup root hash value 402. In one embodiment, the backup listing 149 of FIG. 1 may include the root hash value for each of a plurality of backups that are available on the backup server 140.

The backup root hash value 402 points to a composite 404 for the backup. The backup composite 404 includes hash values pointing to other composites and/or atomics making up the backup. In the illustrated example, the backup composite 404 includes a hash value 406 for a Directory X and a hash value 408 for a Directory Y. Alternately or additionally, the backup composite 404 may include hash values pointing to other directories, folders, files, and the like.

The Directory X hash value 406 points to a composite 410 for Directory X, which includes hash values pointing to other composites and/or atomics making up Directory X. The Directory Y hash value 408 similarly points to a composite 409 for Directory Y which includes hash values pointing to other composites and/or atomics making up Directory Y (not shown).

As shown, the hash values of the Directory X composite 410 include a hash value 412 for File A, a hash value 414 for File B, and a hash value 416 for File C. The File A hash value 412 points to a composite 418 for File A, which includes three hash values 420, 422, and 424 pointing to underlying data atomics 426, 428 and 430. The File B hash value 414 points to a composite 432 for File B that similarly includes hash values 434, 436, 438 and 440 pointing to underlying data atomics 428, 440, 442 and 444. The File C hash value 416 points to atomic 444 without pointing to an intervening composite.

As shown, the hash file system of the present embodiment reduces redundant data by sharing data across files, folders, directories, and so on within a single backup. For instance, data atomic 428 is shared by File A and File B, while data atomic 444 is shared by File B and File C, illustrating the sharing of data across different files.

More importantly for purposes of the present embodiment, the hash file system enables sharing of data across different backups. In other words, composites and/or atomics on the backup server 140 can be pointed to by hash values from two or more different backups. Essentially, this enables the generation of a new full backup from a previous full backup and an incremental by modifying a copy of a previous full backup to point to new and/or modified data identified in the incremental while also still pointing to any unchanged or unmodified data.

In more detail, the generation of a new full backup from a previous full backup and an incremental may proceed as follows. When the file server 116 creates an incremental backup, it first receives a dump date from the backup server 140 or the accelerator node 150 and uses the dump date to identify files or other data that are new and/or modified since the dump date. Once identified, the new and modified files/data are dumped into a tar file or other sequential access format file and sent to the accelerator node 150 for processing.

In some embodiments, the file server 116 implements aspects of the hash file system for data dumped into the tar file. For instance, the file server 116 may break new and/or modified files into data atomics, hash the data atomics, and identify data atomics that are already present on the backup server 140 to prevent redundant data atomics from being included in the incremental backup. The file server 116 may also generate composites or recipes for each new and/or modified file, folder, directory, and other data structures for inclusion in the incremental backup tar file. In other embodiments, the file server 116 simply dumps all the data for each new/modified file into the tar backup file, in which case the aforementioned aspects of the hash file system may be implemented by the accelerator node 150.

Figure 5:
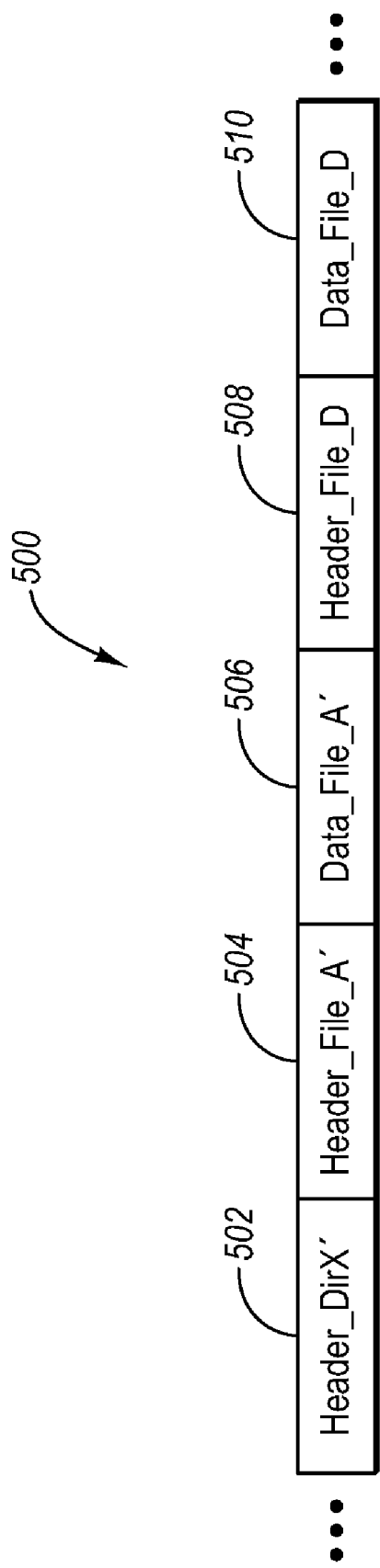
FIG. 5 depicts a portion of a tar stream for an incremental backup.

When the accelerator node 150 receives the incremental backup tar stream from the file server 116, it parses the tar stream and converts it into the hash file system format described above, which may include de-duplicating the incremental backup tar stream. FIG. 5 illustrates a portion 500 of an example incremental backup tar file generated by the file server 116. The incremental backup tar file includes data that is new and/or modified for the file server 116 as of the dump date specified by the backup server. The portion 500 illustrated includes a modified Directory X header 502, a modified File A header 504, modified data 506 for modified File A, a new File D header 508, and new data 510 corresponding to new File D. The accelerator node may also receive a history stream in addition to the incremental backup tar stream indicating that File C has been deleted.

In the embodiment of FIG. 5, the portion 500 of the example incremental backup tar file may correspond to a modified version of the Directory X discussed with respect to FIG. 4. Thus, the modified Directory X header 502 may be a header for a modified version of the Directory X of FIG. 4, the modified File A header 504 may be a header for a modified version of the File A of FIG. 4, and so on.

Figure 6:
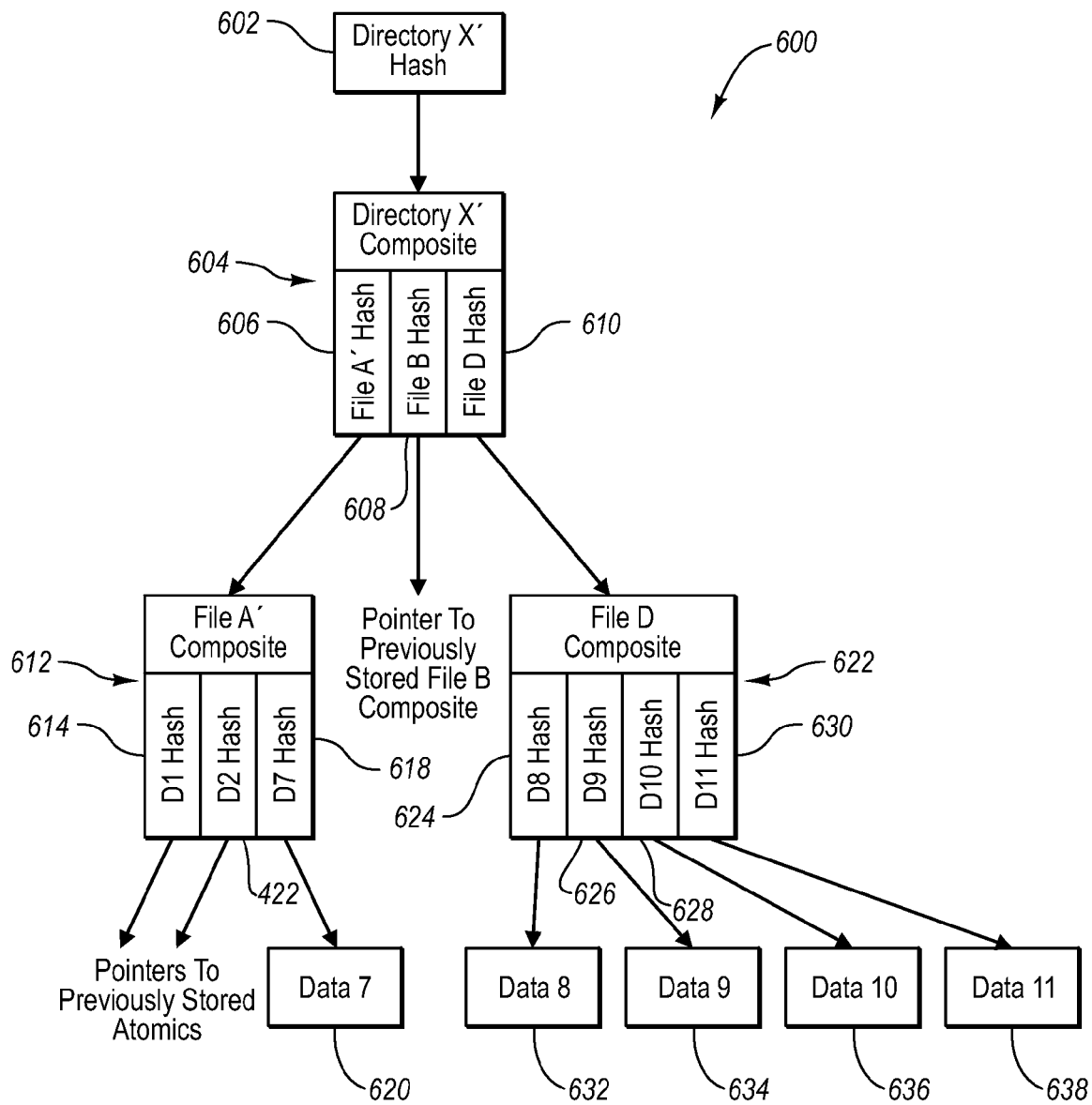
FIG. 6 conceptually illustrates a hash file system format of the incremental backup of FIG. 5.

In any event, the accelerator node parses the incremental backup tar file 500 and in the process converts it to the hash file system, as illustrated in FIG. 6. When de-duplication is performed at the accelerator node, converting the tar file 500 into the hash file system format may include breaking each parsed directory, file, and the like into atomics, creating composites or recipes, hashing the atomics and/or composites, and comparing the resulting hash values to a database of existing hash values corresponding to previously stored data to identify and prevent the storage of redundant data.

As shown, the hash file system representation 600 of the incremental backup of Directory X includes a hash value 602 of modified Directory X, which points to a modified Directory X composite 604 that includes hash values 606, 608, 610 for modified File A, original File B, and new File D. In one embodiment, the modified Directory X hash value 602 and modified Directory X composite 604 (including hash values 606, 608, 610) may have been included in and parsed from the modified Directory X header 502 of FIG. 5. In another embodiment, the modified Directory X hash value 602 and modified Directory X composite 604 are generated at the accelerator node 150 after parsing the incremental tar backup file 500 of FIG. 5.

The modified File A hash value 606 points to a modified File A composite 612 that includes hash values 614, 616, 618 pointing to the atomics making up modified File A. In this case, hash values 614 and 616 point to atomics that were previously stored on the backup server (e.g., atomics 426 and 428 of FIG. 4). One of the three atomics of the original File A (e.g., atomic 430) has been modified or deleted in modified File A and modified File A no longer includes a hash value pointing to the original atomic 430. Instead, modified File A includes a hash value 618 pointing to a modified or new atomic 620. In one embodiment in which de-duplication is performed by the file server 116, the modified File A composite 612 may have been included in and parsed from the modified File A header 504 of FIG. 5, while atomic 620 may have been included in and parsed from the modified File A payload 506. In this case, because the atomics pointed to by hash values 614 and 616 are already stored on the backup server 140, they need not be included in the incremental backup tar file 500 provided to the accelerator node.

In another embodiment in which de-duplication is performed by the accelerator node 150, the incremental backup tar file provided to the accelerator node includes all of the data for modified File A. In this case, the accelerator node parses modified File A from the incremental backup tar file, breaks it into atomics, and generates the modified File A composite 612. The atomics pointed to by hash values 614 and 616 can be discarded since they are already stored on the backup server.

In the embodiment of FIGS. 5 and 6, File B has not been modified since the dump date of the previous backup 400 of FIG. 4. Accordingly, no data for File B, other than the File B hash value 608 pointing to the composite of File B when de-duplication is performed by the file server 116, is included in the tar file 500 of FIG. 5 or hash file system representation 600 of FIG. 6 in the present embodiment. Instead, the File B hash value 608 points to the previously stored File B composite (and through the File B composite to the underlying atomics making up File B) already on the backup server 140. Alternately or additionally, when de-duplication is performed by the accelerator node 150, the tar file 500 may not include any File B data at all.

As indicated previously, the incremental backup tar file 500 may be accompanied by a history stream indicating that File C has been deleted from the modified Directory X. Thus, when the accelerator node converts the incremental backup tar file 500 into the hash file system format 600 and merges it with the history stream, the modified Directory X composite 604 does not include a File C hash value pointing to an underlying File C composite and/or atomics. Alternately or additionally, the hash file system format 600 may include a File C hash value that is not deleted until after the incremental backup is merged with a previous full backup and the history stream.

The new File D hash value 610 points to a new File D composite 622 that includes hash values 624, 626, 628 and 630 pointing to atomics 632, 634, 636, 638. The new File D composite 622 (including hash values 624, 626, 628, 630) may have been included in and parsed from the new File D header 508 of FIG. 5, while the atomics 632, 634, 636, 638 may have been included in and parsed from the new File D payload 510 of FIG. 5. Alternately or additionally, new File D may have been broken into atomics 632, 634, 636, 638 by the accelerator node, which also generates the new File D composite 622.

Once the accelerator node 150 has parsed the incremental backup tar file 500 and converted it to the hash file system format conceptually illustrated in FIG. 6, the new data identified in the incremental backup tar file (e.g., atomics 620, 632, 634, 636, 638) and the new composite data (e.g., composites 604, 612, 622) received in the tar file or generated by the accelerator node can be stored by content in the backup server 140.

To create a new full backup from the incremental backup 600, the accelerator node 150 reads a copy of the metadata for a previous full backup from the backup metadata 146 of the backup server 140 into memory 152. The accelerator node 150 chooses a particular previous full backup based on the dump date provided to the file server 116 when the incremental backup was requested. In this example, the dump date provided to the file server 116 corresponds to the dump date of the previous full backup 400 of FIG. 4 and for this reason the accelerator node chooses the previous full backup 400.

Figure 7:
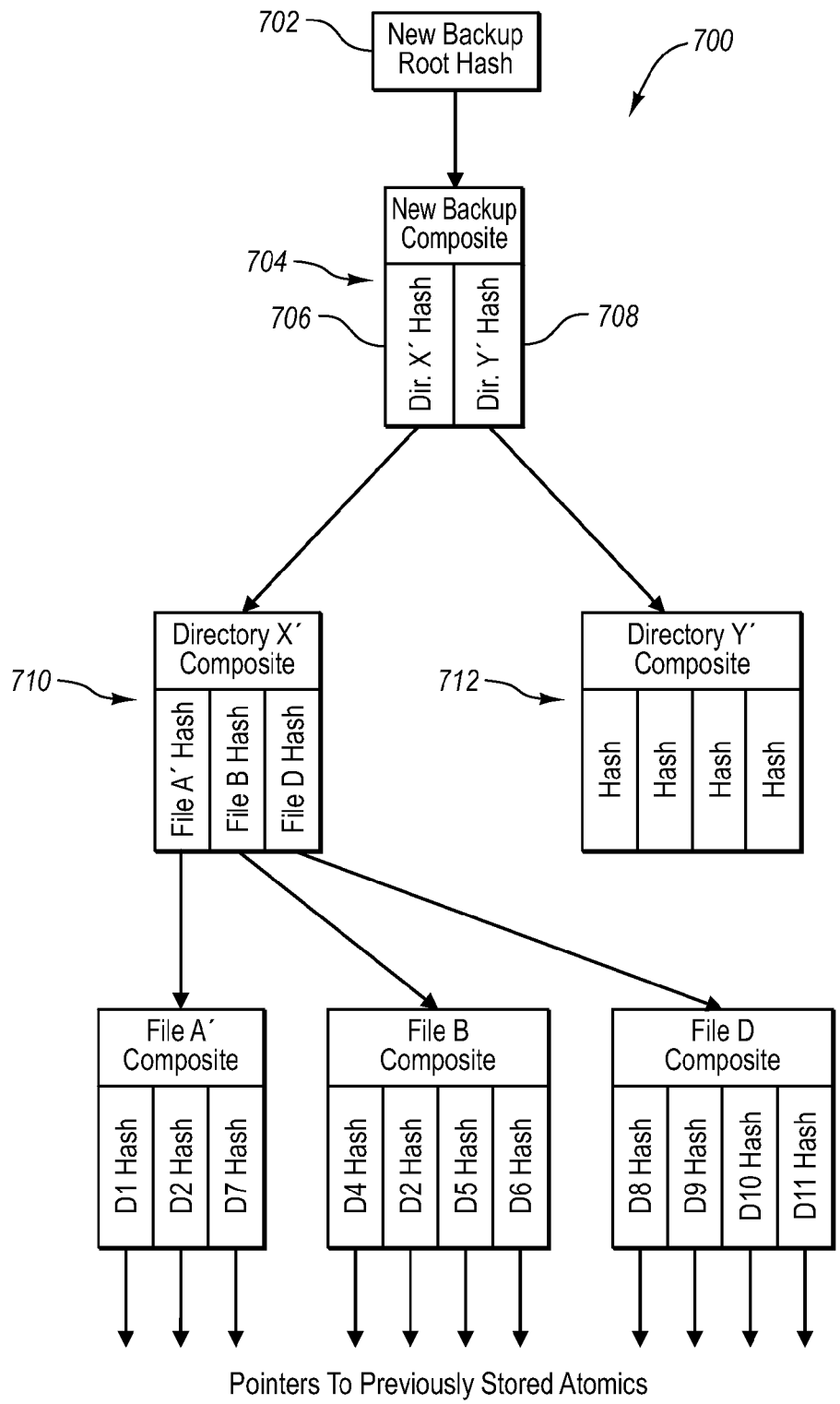
FIG. 7 conceptually illustrates a hash file system format of a new full backup obtained by merging the previous full backup of FIG. 4 with the incremental backup of FIG. 6.

The metadata for the previous full backup 400 that is read into the memory 152 includes the hash values and composites of the previous full backup 400. The accelerator node can then merge the metadata (including hash values and composites) of the incremental backup 600 into the metadata of the previous full backup 400 to generate a new full backup, illustrated as new full backup 700 in FIG. 7.

Merging the incremental backup and the previous full backup to generate a new full backup may include modifying the copy of the metadata of the previous full backup with the metadata of the incremental backup. For instance, root hash 402 for the previous full backup may be replaced by a root hash 702 for the new full backup. The root hash 702 for the new full backup 700 points to a backup composite or directory element 704 that replaces the previous backup composite or directory element 404. The new backup composite 704 includes hash values 706, 708 pointing to composites 710, 712 for modified Directory X and modified Directory Y, respectively. The modified directory composites 710, 712 further include hash values pointing to modified, new, and/or old composites depending on whether the incremental backup included modified, new, and/or old data. Once the metadata for the incremental backup has been merged into the copy of the metadata for the previous full backup, the resulting metadata can be saved in the backup server 140 as a new full backup. Alternately or additionally, the history stream can be merged into the new full backup metadata prior to saving the new full backup metadata in the backup server 140.

Advantageously, the methods and systems of the present invention enable the generation of new full backups using incremental backups and previous full backups, thereby reducing network traffic and file server down time. In particular, once the file server sends the backup server a first full backup, there is no need to perform anymore full backups. Instead, the file server can provide the backup server with incremental backups, which are typically much smaller than full backups, requiring much less file server downtime and network bandwidth. At the accelerator node (or the backup server in one embodiment), an incremental backup can be merged into a previous full backup to generate a new full backup, which can then be used for merging with a subsequent incremental to make a subsequent new full backup.

In addition to reducing file server down time and required network bandwidth, embodiments of the invention improve restore operations. For instance, in a conventional system, a file server may generate weekly full backups and daily incremental backups. To restore a file, the system has to begin with the prior weekly full backup, and then restore any modifications using each of the subsequent incrementals. Thus, if the file is lost or corrupted shortly before the next weekly full backup, the file may need to be restored in as many as seven steps (e.g., one for the weekly full and six for the subsequent incrementals).

In contrast, using embodiments of the present invention, a file can be restored in one operation. In particular, since each incremental backup is merged with a previous full backup to create a new full backup, the most recent new full backup is current and complete up to the date of the incremental. Thus, a new full backup can be used to restore a file or other data in a single step.

The embodiments described herein may include the use of a special purpose or general-purpose computer including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired and wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in hardware or a combination of software and hardware are also possible and contemplated. In this description, a "computing entity" may be any computing system as previously defined herein, or any module or combination of modulates running on a computing system.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of generating new full backups from an incremental backup and a previous full backup, the method comprising:
   receiving an incremental backup in a sequential access format stream from a file server;
   parsing the sequential access format stream into one or more directories and files that are modified or new as of a dump date of a previous full backup of the file server, wherein the incremental backup is stored in randomly accessible storage;
   generating incremental backup metadata describing the organization of the one or more directories and files of the incremental backup;
   receiving metadata for the previous full backup from a backup server, the previous full backup metadata describing the organization of one or more directories and files on the file server as of the dump date; and
   merging the incremental backup metadata into the previous full backup metadata to generate metadata for a new full backup, the new full backup metadata describing the organization of all directories and files on the file server, including the one or more directories and files that are modified or new as of the dump date of the previous full backup, as of a dump date of the incremental backup.

2. The method of claim 1, further comprising, storing data from the incremental backup on the backup server as one or more data atomics, wherein data for the previous full backup is also stored on the backup server as one or more data atomics.

3. The method of claim 2, wherein the metadata for the new full backup includes pointers that point to all of the one or more data atomics of the incremental backup and one or more data atomics of the previous full backup.

4. The method of claim 3, wherein merging the incremental backup metadata into the previous full backup metadata comprises:
for a new directory or file, adding metadata corresponding to the new directory or file to the previous full backup metadata, the new metadata pointing to one or more corresponding new data atomics; and
for a modified directory or file, updating metadata corresponding to the modified directory or file to point to one or more corresponding modified data atomics.

5. The method of claim 1, wherein the sequential access format comprises one or more of tar format, emctar format, pax format, and px format.

6. The method of claim 1, further comprising, receiving a history stream from the file server, the history stream containing a list of all files and directories on the file server as of a dump date of the incremental backup.

7. The method of claim 6, further comprising, merging the history stream into the new full backup metadata, wherein merging the history stream into the new full backup metadata comprises:
comparing the list of all files and directories in the history stream to files and directories in the new full backup metadata; and
if a file or directory is identified in the new full backup metadata but is not included in the list of all files and directories in the history stream, deleting the metadata for the file or directory from the new full backup metadata.

8. The method of claim 1, further comprising, storing the new full backup metadata in the backup server, wherein the backup server additionally stores the previous full backup metadata and metadata for one or more additional previous full backups, each having a different dump date.

9. The method of claim 8, wherein metadata for one of the one or more additional previous full backups is generated from a full backup in a sequential access format stream received from the file server and wherein metadata for the previous full backup and all but the one of the one or more additional previous full backups are generated in the same manner as the new full backup by merging metadata of an incremental backup into metadata of a previous full backup.

10. The method of claim 8, further comprising, restoring data to the file server to a particular point in time in one operation using any one of the new full backup, the previous full backup, or a single one of the one or more additional previous full backups.

11. A method of generating subsequent full backups using previous full backups and incremental backups, the method comprising:
receiving, from a file server, an incremental backup of a data set on the file server in a sequential access format, the incremental backup including one or more directories and files that are new or modified as of a dump date of a previous full backup of the data set;
parsing the incremental backup into the one or more directories and files that are new or modified;
converting the parsed incremental backup into a hash file system format that includes metadata describing the organization of the one or more directories and files that are new or modified, a plurality of data atomics making up one or more new or modified directories and files, and hash values for use as pointers to the plurality of data atomics; and
merging the incremental backup in the hash file system format into the previous full backup in the hash file system format to generate a new full backup in the hash file system format.

12. The method of claim 11, further comprising, receiving a history stream from the file server, the history stream containing a list of all files and directories in the data set on the file server as of a dump date of the incremental backup.

13. The method of claim 12, further comprising, merging the history stream into the new full backup in the hash file system format.

14. The method of claim 13, wherein merging the history stream into the new full backup in the hash file system format comprises:
comparing the list of all files and directories in the history stream to files and directories described and pointed to in the new full backup; and
if a file or directory is described or pointed to in the new full backup but is not included in the history stream, deleting from the new full backup any metadata, hash values, or both that describe or point to the file or directory not included in the history stream.

15. The method of claim 11, further comprising, prior to receiving the incremental backup in the sequential access format:
receiving, from the file server, the previous full backup of the data set in the sequential access format;
parsing the previous full backup into one or more directories and files making up the data set;
converting the parsed previous full backup to the hash file system format that includes metadata describing the organization of the one or more directories and files, a plurality of data atomics into which the data set is separated, and hash values for use as pointers to the plurality of data atomics; and
storing the previous full backup in the hash file system format in a backup server.

16. The method of claim 15, wherein merging the incremental backup in the hash file system format into the previous full backup in the hash file system format comprises:
receiving, from the backup server, a copy of the metadata and hash values of the previous full backup; and
performing one or more of the following:
for a modified directory made up of one or more modified files, data atomics, or both, changing the copy of the metadata and hash values describing and pointing to one or more corresponding unmodified files, data atomics, or both, of the corresponding unmodified directory in the previous full backup to describe and point to the one or more modified files, data atomics, or both;
for a new directory made up of one or more new files, data atomics, or both, adding metadata and hash values describing and pointing to the one or more new files, data atomics, or both, to the copy of the metadata and hash values of the previous full backup;
for a modified file made up of one or more modified data atomics, changing the copy of the metadata and hash values describing and pointing to one or more corresponding unmodified data atomics of the corresponding unmodified file in the previous full backup to describe and point to the one or more modified data atomics; and
for a new file made up of one or more new data atomics, adding metadata and hash values describing and pointing to the one or more new data atomics to the metadata and hash values of the previous full backup.

17. The method of claim 11, wherein the method is performed by one or more of a backup server and an accelerator node.

18. The method of claim 11, wherein the new full backup has a dump date corresponding to a dump date of the incremental backup, the method further comprising:
   receiving a subsequent incremental backup of the data set on the file server, the incremental backup including one or more directories and files that are new or modified as of the dump date of the new full backup;
   parsing the subsequent incremental backup into the one or more directories and files that are new or modified as of the dump date of the new full backup;
   converting the parsed subsequent incremental backup into the hash file system format; and
   merging the subsequent incremental backup in the hash file system format into the new full backup in the hash file system format to generate a subsequent new full backup in the hash file system format.

19. The method of claim 18, further comprising, restoring all or a portion of the data set to a particular point in time in one operation using any one of the previous full backup, the new full backup, or the subsequent new full backup.

20. The method of claim 11, wherein:
   the hash file system format includes composites for reconstructing a file or directory from one or more underlying data atomics, composites, or both; and
   merging the incremental backup in the hash file system format into the previous full backup in the hash file system format to generate a new full backup in the hash file system format comprises:
      receiving a copy of the previous full backup; and
      adding composites for new files or directories to the copy of the previous full backup, or replacing composites in the copy of the previous full backup for corresponding unmodified files or directories with composites for the modified files or directories.

* * * * *